United States Patent
Aoshima et al.

(10) Patent No.: US 7,082,825 B2
(45) Date of Patent: Aug. 1, 2006

(54) SMOKING DEVICE INCLUDING A FLOWMETER

(75) Inventors: Shigeru Aoshima, Tokyo (JP); Junichi Matsuda, Tokyo (JP); Isamu Warashina, Tokyo (JP); Yasuharu Ooishi, Tokyo (JP)

(73) Assignee: Yamatake Corporation, Tokyo (JP)

( * ) Notice: Subject to any disclaimer, the term of this patent is extended or adjusted under 35 U.S.C. 154(b) by 198 days.

(21) Appl. No.: 10/745,788

(22) Filed: Dec. 23, 2003

(65) Prior Publication Data
US 2004/0168513 A1 Sep. 2, 2004

(30) Foreign Application Priority Data
Dec. 27, 2002 (JP) ............................. 2002-379368
Dec. 27, 2002 (JP) ............................. 2002-379369

(51) Int. Cl.
*G01F 1/68* (2006.01)

(52) U.S. Cl. .................................. 73/204.22
(58) Field of Classification Search ............. 73/204.22, 73/204.26, 204.11, 202.5, 861.08; 131/328, 131/329, 330, 331
See application file for complete search history.

(56) References Cited

U.S. PATENT DOCUMENTS 4,785,662 A * 11/1988 Ohta et al. ................ 73/204.21
5,878,752 A    3/1999 Adams et al.
5,934,289 A * 8/1999 Watkins et al. ............. 131/328
6,006,757 A * 12/1999 Lichtenberg ................ 131/187
6,938,473 B1* 9/2005 Iwaki et al. ............. 73/204.21

FOREIGN PATENT DOCUMENTS

JP          02-259527       10/1990
JP          04-230808        8/1992

* cited by examiner

*Primary Examiner*—Edward Lefkowitz
*Assistant Examiner*—Corey D. Mack
(74) *Attorney, Agent, or Firm*—Frishauf, Holtz, Goodman & Chick, P.C.

(57) ABSTRACT

A waste-material entry prevention member arranged upstream of a flow sensor is a rod- or plate-like member protruding halfway across the cross-section of a flow passage. Hence, vortexes or energy of the vortexes produced in fluid flowing by the waste-material entry prevention member is diffused by a stream of the fluid passing through a space left between the waste-material entry prevention member and the wall surface of the flow passage which the waste-material entry prevention member faces. Thus, production of vortexes is held down. Further, by making the flow sensor generate heat or heating the flow sensor, thermophoresis of the fluid is caused near the surface of the flow sensor. By this, particles contained in the fluid are prevented from accumulating on the flow sensor.

8 Claims, 4 Drawing Sheets

SMOKING DEVICE INCLUDING A FLOWMETER

CROSS-REFERENCE TO A RELATED APPLICATION

This application claims priority on Japanese Patent Application No. 2002-379368 and Japanese Patent Application No. 2002-379369, the entire contents of which are hereby incorporated by reference.

BACKGROUND OF THE INVENTION

1. Field of the Invention

The invention relates to a flowmeter of simple structure which can effectively prevent waste material from entering a flow passage in which a flow sensor is arranged, without disturbing a flow of fluid, and/or effectively prevent aerosol (particles) contained in fluid from adhering to the surface of a thermal flow sensor, and to a smoking device using this flowmeter.

2. Description of the Related Art

A sensor for detecting the flow rate of fluid such as gas or air, there is known a thermal flow sensor having a structure in which a pair of temperature measuring parts (temperature detecting elements) are arranged in the direction of flow of fluid with a predetermined space between and a heat generating part (heater element) is arranged between these temperature measuring parts. The thermal flow sensor of this type makes use of the fact that the temperature distribution in the vicinity of the surface of the sensor produced when the heat generating part generates heat varies depending on the flow velocity of fluid. For example Japanese Unexamined Patent Publication No. 4-230808 discloses a thermal flow sensor which detects temperature difference as representing the above-mentioned temperature distribution using a pair of temperature measuring parts and determines the mass flow rate of fluid from the detected temperature difference. Japanese Unexamined Patent Publication No. 2-259527 discloses a thermal flow sensor in which a pair of temperature measuring parts are made to self-heat to detect the flow rate of fluid. In the thermal flow sensor of this type, the self-heating of the temperature measuring parts may cause a temperature-measurement error. Hence, generally, the accuracy of measurement is secured by keeping drive voltage for the temperature measuring parts as low as possible.

To solve a problem of smoke produced by smoking cigarettes, for example U.S. Pat. No. 5,878,752 discloses a smoking device which heats a cigarette with a heater when the cigarette is sucked on, to extract only its flavor and aroma without burning the cigarette. In this smoking device, the flow of air produced by sucking on a cigarette is detected with a thermal flow sensor of the above-described type, and the heater is driven to generate heat on the basis of the detection.

In this type of smoking device, when the flow of air (fluid) containing a large amount of various types of aerosol (particles) and/or waste material should be detected by a thermal flow sensor, there is a possibility that aerosol and/or waste material will adhere to and accumulate on the surface of the flow sensor. When aerosol and/or waste material adheres to the surface of the flow sensor, it leads to not only deterioration in measurement accuracy of the flow sensor but also breakage of the flow sensor. Hence, conventionally, a waste-material entry prevention member such as a filter or a rod-like protrusion is provided in the flow passage, upstream of the flow sensor.

However, when the waste-material entry prevention member is provided like this, the waste-material entry prevention member interferes with the flow of fluid, so that the flow rate cannot be measured accurately. Further, when the flow rate of fluid varies rapidly like when the fluid begins to flow, vortexes (for example Karman vortexes) tend to be produced in the flow of fluid after the waste-material entry prevention member. Hence, when the flow rate should be measured, for example it is necessary to obtain a measured value repeatedly over a predetermined period of time, determine whether the fluid has been flowing smoothly or not on the basis of the obtained measured values, and then evaluate those measured values. Specifically, it is necessary to determine, on the basis of a tendency found in variation of the measured value, whether or not temperature variation has been produced by fluctuation of the fluid flow or the like. Hence, it takes time before an accurate measured value is obtained, and deterioration in responsiveness is inevitable.

Further, even if the waste-material entry prevention member is provided, aerosol and/or waste material contained in gas or air gradually accumulates on the surface of the thermal flow sensor when the thermal flow sensor is used over a long period of time. The aerosol and/or waste material accumulated on the sensor surface prevents transmission of heat from the heat generating part and to the temperature measuring parts and thereby makes the measurement accuracy worse. The accumulated aerosol and/or waste material also produces problems such that it makes the speed of response in flow-rate detection worse. Particularly when the thermal flow sensor is used as a current-supply control means for a heater in the above-described smoking device, the above-mentioned problems are serious, since aerosol flowing from a cigarette as so-called side stream smoke easily accumulates on the surface of the thermal flow sensor.

SUMMARY OF THE INVENTION

The invention was made in view of the above problems. A first object of the invention is to provide a flowmeter of simple structure which can effectively prevent waste material from entering a flow passage in which a flow sensor is provided, without disturbing a flow of fluid.

A second object of the invention is to provide a flowmeter which can easily and surely prevent aerosol from accumulating on the surface of a flow sensor and which enables stable flow-rate measurement over a long period of time.

A third object of the invention is to provide a smoking device with high operation reliability using a flowmeter of the above-describe type as a current-supply control means for a heater for heating a cigarette.

In order to attain the first object, a flowmeter according to the invention has a waste-material entry prevention member arranged upstream of a flow sensor which is arranged at a wall surface of a case which defines a predetermined flow passage, wherein the waste-material entry prevention member is provided particularly as a rod- or plate-like member having, for example an almost circular cross-section, formed at a wall surface which defines the flow passage, and protruding halfway across the cross-section of the flow passage.

For example, the waste-material entry prevention member is arranged at a wall surface which faces the wall surface at which the flow sensor is arranged, leaving a predetermined gap between a fore-end of the waste-material entry prevention member and the wall surface at which the flow sensor is arranged (the opposite surface). Desirably, the flow sensor is a thermal flow sensor comprising a pair of temperature measuring parts arranged in the direction of flow of fluid with a space between and a heat generating part arranged between the temperature measuring parts.

In the flowmeter having this structure, it is obvious that the waste-material entry prevention member arranged at an upstream part of the flow passage can prevent entry of waste material contained in fluid. In addition, since the waste-material entry prevention member is formed as a rod- or plate-like member protruding halfway across the cross-section of the flow passage, leaving a gap between the fore-end of the waste-material entry prevention member and the wall surface which the waste-material entry prevention member faces, vortexes (Karman vortexes or the like) are not easily produced in fluid and the flow of fluid can be kept smooth.

Specifically, since the rod- or plate-like waste-material entry prevention member protrudes only halfway across the cross-section of the flow passage, vortexes, or energy of the vortexes produced when fluid flows by the waste-material entry prevention member is immediately diffused by a stream of the fluid which passes through a space left between the waste-material entry prevention member and the wall surface it faces. Hence, vortexes produced around the waste-material entry prevention member do not develop. Thus, the flow of the fluid directed toward the flow sensor can be stabilized. As a result, flow rate measurement can be carried out stably with good responsiveness.

In order to attain the second object, a thermal flowmeter according to the invention comprises a thermal flow sensor including a pair of temperature measuring parts (temperature detecting elements); a flow-rate measurement means for obtaining the flow rate of fluid flowing along a surface of the thermal flow sensor from difference between temperatures detected by the temperature measuring parts, separately, and; a temperature control means for either increasing a drive voltage or a drive current for the pair of temperature measuring parts to make the temperature measuring parts generate heat or driving a heat generating member arranged near the temperature measuring parts to generate heat, thereby causing thermophoresis of the fluid near the surface of the thermal flow sensor, and thereby preventing particles contained in the fluid from adhering to the thermal flow sensor.

Here, thermophoresis of fluid means a phenomenon that aerosol (particles) contained in fluid such as gas or air moves from a place higher in temperature to a place lower in temperature.

In the flowmeter having this structure, thermophoresis can be caused near the surface of the thermal flow sensor only by increasing a drive voltage or a drive current for the temperature measuring parts, which is normally kept at as low a level as possible in order to hold down self-heating of the temperature measuring parts, and thereby making the temperature measuring parts generate heat, or alternatively by driving a heat generating member arranged near the temperature measuring parts to generate heat. Because of this thermophoresis, aerosol contained in fluid such as gas or air can be kept away from the surface of the thermal flow sensor. Thus, adhesion of aerosol to the thermal flow sensor can be prevented effectively. As a result, flow rate measurement can be carried out with the thermal flowmeter over a long period of time, stably.

Even when the temperature measuring parts are made to generate heat, the accuracy of measurement can be easily ensured by making temperature correction to a measured value of flow rate on the basis of the temperatures of the temperature measuring parts which generate heat.

The heat generating member arranged near the temperature measuring parts may be, for example a member implanted in a base of the thermal flow sensor to heat the entire thermal flow sensor, or a member placed between the temperature measuring parts. Desirably, the temperature control means is so arranged as to increase the surface temperature of the thermal flow sensor for a predetermined time, for example when the flow rate obtained by the flow-rate measurement means decreases to a large degree. This means that thermophoresis is caused only when the flow rate is low and therefore aerosol can easily stay on the surface of the thermal flow sensor.

In order to attain the third object, a smoking device according to the invention comprises a bottomed tubular holder for surrounding a cigarette excepting a mouth end of the cigarette, an outside-air drawing-in passage connected to the bottom of the holder, for drawing outside air to a fore-end of the cigarette fitted in the holder, a flowmeter arranged in the outside-air drawing-in passage for detecting the flow of outside air drawn into the holder, and a heater incorporated in the holder, and so arranged as to be driven to heat the cigarette fitted in the holder when the flow of outside air drawn into the holder is detected by the flowmeter, wherein the flowmeter is provided particularly as a thermal flowmeter which has a waster-material entry prevention member of the above-described structure and/or a temperature control means for causing thermophresis of fluid near the surface of the flow sensor.

In the smoking device having this structure, while waste material can be surely prevented from going into the interior of the flowmeter incorporated in the outside-air drawing-in passage, the flow of air drawn in through the outside-air drawing-in passage by sucking can be stabilized. Hence, the above-mentioned problem of vortexes is not produced, and the flow rate of fluid can be detected stably and with good responsiveness.

Further, aerosol which flows from a cigarette toward the outside-air drawing-in passage as so-called side stream smoke after the cigarette is sucked on can be effectively prevented from adhering to the surface of the thermal flow sensor. Hence, the thermal flow sensor's ability to detect the flow rate can be maintained stably for a long period of time. As a result, control can be performed so that when a cigarette is sucked on, the heater will supplied with a current to heat the cigarette, without delay and reliably.

DETAILED DESCRIPTION OF THE PREFERRED EMBODIMENTS

Figure 1:
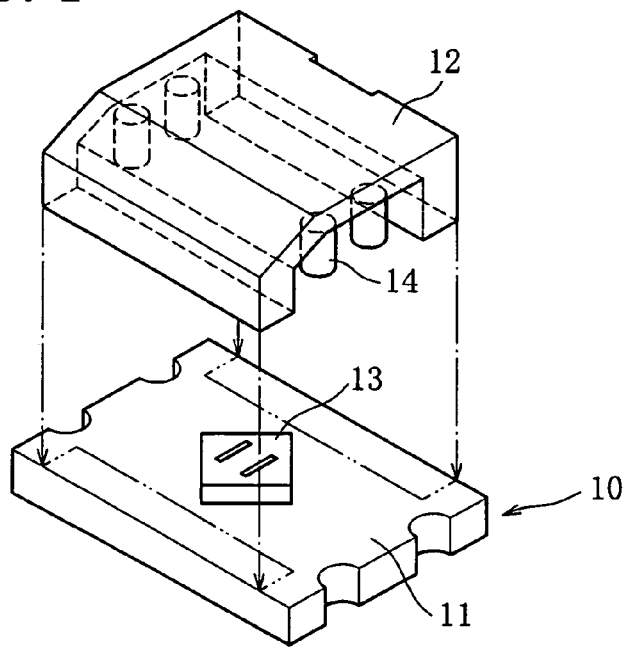
FIG. 1 is an exploded perspective view showing a schematic structure of a flowmeter according to an embodiment of the invention.

Referring to the drawings, a thermal flowmeter according to the invention will be described.

FIG. 1 is an exploded perspective view showing a schematic structure of a flowmeter according to an embodiment of the invention. Reference numeral 10 denotes a case which forms a predetermined flow passage. The case 10 comprises a slab-like lower case 11 and an upper case 12. The upper case 12 is joined to the upper surface of the lower case 11 integrally, so that a flow passage having an almost rectangular cross-section is formed between the upper and lower cases. A flow sensor 13 incorporated into the case 10 for detecting the flow rate of fluid such as gas or air flowing through the flow passage is, for example a thermal flow sensor described later, and arranged in the center of the upper surface of the lower case 11.

Figure 2:
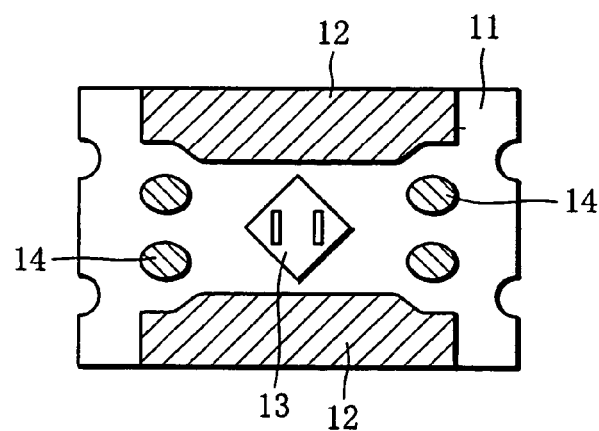
FIG. 2 is a plan view of the flowmeter of FIG. 1, where part of the flowmeter is cut away.
Figure 3:
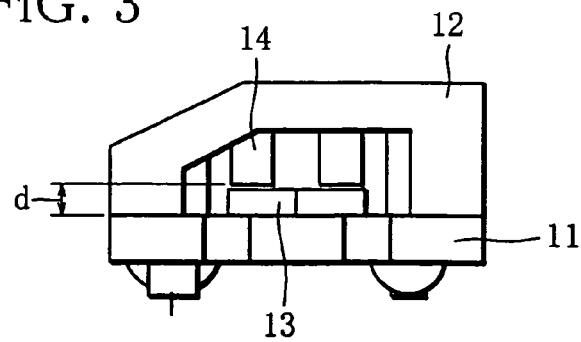
FIG. 3 is a side view of the flowmeter of FIG. 1.

FIG. 2 shows a two-dimensional arrangement of the case 10, where part of the upper case 12 is cut away. As seen in FIG. 2, rod-like waste-material entry prevention members 14 for preventing waste material from entering the flow passage are arranged at an entrance and an exit of the flow passage. FIG. 3 is a side view of the case. As seen in FIG. 3, the waste-material entry prevention members 14 are formed on the internal surface of the upper case 12 which faces the upper surface of the lower case 11, particularly as almost columnar rod-like members protruding halfway across the cross-section of the flow passage.

The waste-material entry prevention members 14 are formed as protrusions of the length which does not protrude across the entire cross-section of the flow passage so that predetermined gaps d will be left between the individual waste-material entry prevention members and the upper surface of the lower case 11. Specifically, when the cross-section of the flow passage formed in the case 10 is about 4 mm in width and about 1.5 mm in height, the waste-material entry prevention members 14 are almost columnar protrusions of about 0.5 mm in diameter and about 1 mm in length, and formed on the internal surface of the upper case 12 to protrude in pairs parallel to each other. Between the fore-ends (lower ends) of the waste-material entry prevention members 14 and the upper surface of the lower case 11, there are gaps of about 0.5 mm.

Figure 4:
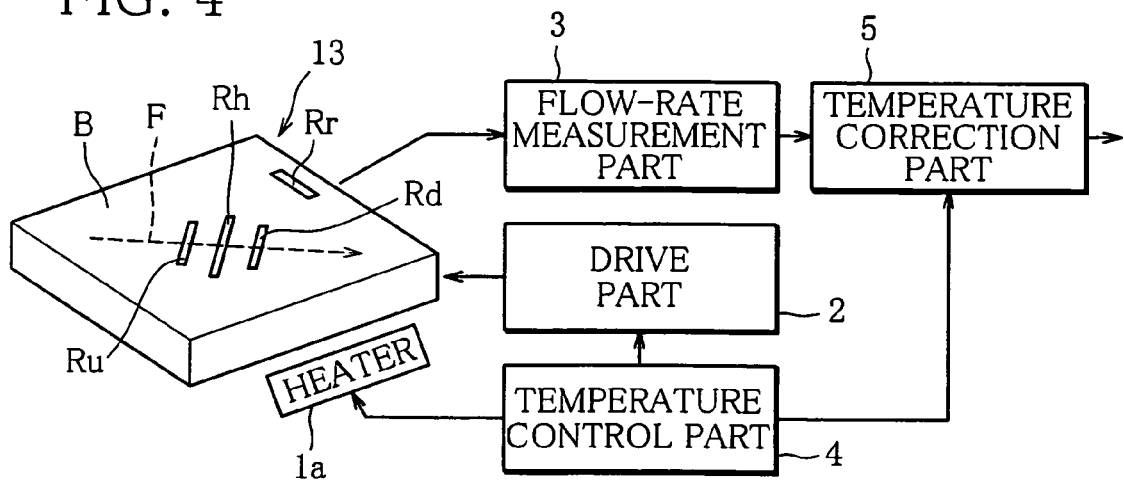
FIG. 4 is an illustration showing an example of a thermal flow sensor incorporated into the flowmeter of FIG. 1.

The thermal flow sensor 13 arranged in the center of the upper surface of the lower case 11 is a semiconductor chip 1. As shown in FIG. 4, the thermal flow sensor 13 has basically a device structure in which a pair of temperature measuring resistors as temperature sensors (temperature measuring parts) Ru, Rd are arranged on a silicon base B in the direction F of flow of fluid, with a heat generating resistor as a heater element (heat generating part) Rh between. Making use of the fact that the degree of dispersion of heat emitted from the heater element Rh (temperature distribution) varies depending on the flow of fluid, the thermal flow sensor 13 is arranged to detect the mass flow rate Q of the fluid from change in resistance values of the temperature sensors Ru, Rd due to heat. Reference symbol Rr in FIG. 4 denotes a temperature measuring resister provided as a temperature sensor for measuring ambient temperature, which is arranged away from the heater element Rh.

Figure 5:
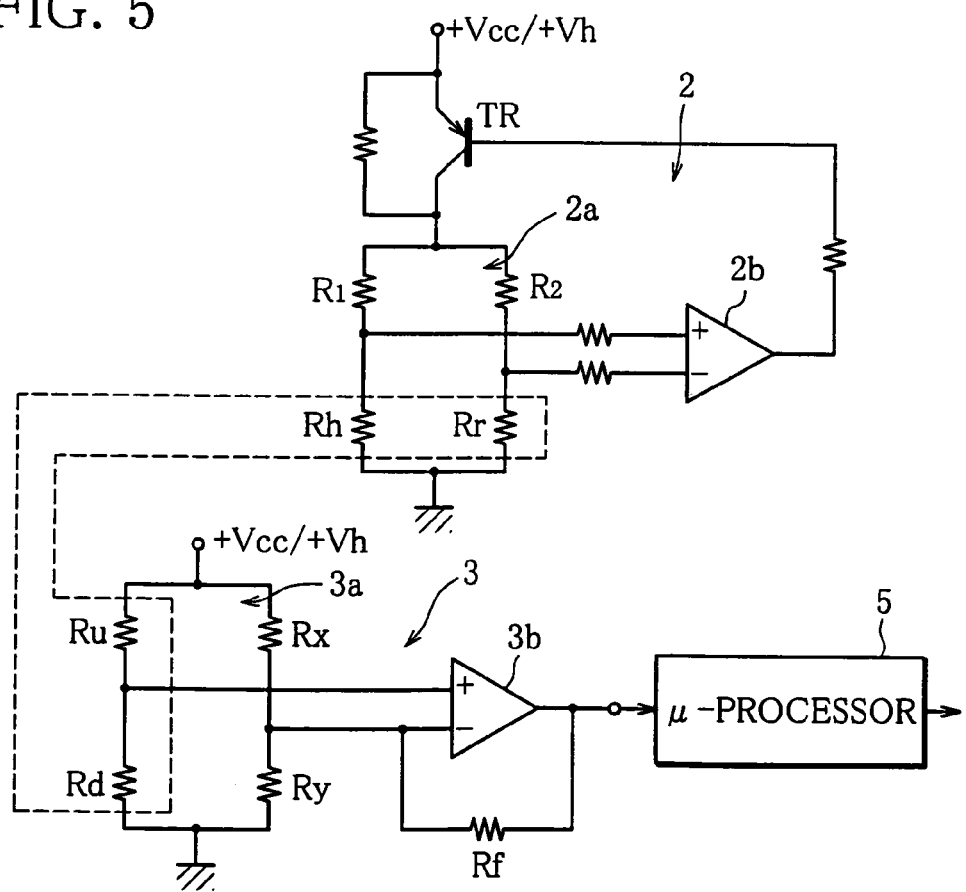
FIG. 5 is a diagram of an example of arrangement of a drive part and a flow-rate measurement part of the thermal flow sensor of FIG. 4.

In other words, the thermal flow sensor 13 is so arranged that while a drive part 2 drives the heater element Rh to generate heat to have a fixed temperature, a flow-rate measurement part 3 detects change in resistance values of the temperature sensors Ru, Rd due to temperature. More specifically, as shown in FIG. 5, the drive part 2 for the heater element Rh comprises a bridge circuit 2a including the heater element Rh, the temperature sensor Rr for measuring the ambient temperature and a pair of fixed resistors R1, R2. Voltage Vcc supplied from a predetermined power source is applied to the bridge circuit 2a through a transistor TR. Bridge output voltage of the bridge circuit 2a is obtained by a differential amplifier 2b. Heater drive voltage applied to the bridge circuit 2a is adjusted by feedback-controlling the transistor TR so that the bridge output voltage will be zero. By the heater drive part provided like this, the temperature of the heater element Rh which generates heat is so controlled that it will be always higher than the ambient temperature around it by a fixed value.

The flow-rate measurement part 3 for detecting the flow rate Q of fluid flowing along the surface of the thermal flow sensor 13 (silicon base B) from change in resistance values of the temperature sensors Ru, Rd due to heat comprises a bridge circuit 3a for measuring the flow rate including the above-mentioned pair of temperature sensors Ru, Rd and a pair of fixed resistors Rx, Ry. Bridge output voltage of the bridge circuit 3a which varies depending on change in resistance values of the temperature sensors Ru, Rd is detected by a differential amplifier 3b. Under the condition that the heating value of the heater element Rh is kept constant by the drive part 2, the flow rate Q of fluid flowing along the surface of the thermal flow sensor 13 is obtained from the bridge output voltage detected by the differential amplifier 3b.

While the thermal flow sensor 13 in which a pair of temperature sensors Ru, Rd are arranged with a heater element Rh between is taken as an example here, a flow sensor of a type in which no heater element Rh is provided but a pair of temperature sensors Ru, Rd are made to self-heat to measure the flow rate can be used likewise. Needless to say, the pair of temperature sensors Ru, Rd may be driven either with a constant current or with a constant voltage. Further, instead of the temperature measuring resistor, a device such as a thermistor, a thermocouple, or a thermopile may form the temperature measuring part.

The thermal flow sensor 13 also includes a temperature control part 4 for raising the surface temperature of the semiconductor chip 1 and thereby causing thermophoresis near the surface of the thermal flow sensor 13. By causing thermophoresis near the surface of the thermal flow sensor 13 (silicon base B; semiconductor chip 1), the temperature control part 4 prevents particles contained in fluid of which the flow rate should be measured from adhering to the thermal flow sensor 13. The temperature control part 4 comprises, for example a means for applying to the bridge circuits 2a, 3a shown in FIG. 5 voltage Vh of 2.5V or so, which is higher than the drive voltage Vcc of 1V or so normally applied to the bridge circuits 2a, 3a, instead of the drive voltage Vcc, or alternatively, a means for driving a heater element la implanted in the silicon base B (semiconductor chip 1) for heating, to generate heat.

Specifically, by increasing a drive voltage applied to the heater element Rh and the temperature sensors Ru, Rd, which are resistors of platinum (Pt) or the like, or by increasing a drive current supplied to them, the temperature control part 4 makes the heater element Rh and the temperature sensors Ru, Rd generate a large amount of heat, thereby causes thermophoresis near their surfaces, and thereby keep aerosol (particles) contained in the fluid away from the surface of the silicon base B (thermal flow sensor 13). Alternatively, the temperature control part 4 drives the heater element la arranged near the temperature sensors Ru, Rd of the thermal flow sensor 13 to generate heat, thereby causes thermophoresis near the surface of the thermal flow sensor 13, and thereby keeps aerosol (particles) contained in the fluid away from the surface of the silicon base B.

Needless to say, when thermophoresis is caused this way, temperature distribution near the surface of the thermal flow sensor 13 (silicon base B) varies. Hence, when the flow rate is measured in this state, temperature correction should be made to the flow rate obtained by the flow-rate measurement part 3 considering the temperature of the thermal flow sensor which generates heat. It may be so arranged that information on the surface temperature of the thermal flow sensor 13 is given to a temperature correction part 5 comprising, for example a microprocessor, and that the temperature correction part 5 makes temperature correction to the output of the flow-rate measurement part 3 before feeding it out.

In the flowmeter provided with the above-described waste-material entry prevention members 14, even if waste material such as yarn waste is contained in the fluid directed into the flow passage in the case 10, the waste-material entry prevention members 14 arranged at the entrance of the flow passage prevents entry of the waste material. Hence, the thermal flow sensor 13 can measure the flow rate of the fluid only, namely the fluid from which the waste material has been removed, with high accuracy. In particular, since the waste-material entry prevention members 14 are almost columnar rod-like members protruding halfway across the cross-section of the flow passage and leaving the gaps d between their fore-ends and the upper surface of the lower case 11, vortexes are not easily produced in the fluid flowing by the waste-material entry prevention members 14.

Specifically, since the waste-material entry prevention members 14 protrude only halfway across the cross-section of the flow passage, vortexes, or energy of the vortexes produced when the fluid flows by the waste-material entry prevention members 14 is immediately diffused by those streams of the fluid which pass through the spaces left between the waste-material entry prevention members 14 and the wall surface which the waste-material entry prevention members 14 face (gaps between the waste-material entry prevention members and the lower case 11). Hence, vortexes produced around the waste-material entry prevention members 14 do not develop but are diffused quickly. Thus, the flow of the fluid directed toward the area in which the thermal flow sensor 13 is arranged can be stabilized and kept from being influenced by vortexes. As a result, flow rate measurement can be carried out with good responsiveness, without troublesome steps such as determining whether vortexes are produced or not and starting the flow rate measurement after influence of vortexes disappears.

The height of the gap between the waste-material entry prevention member 14 and the lower case 11, or in other words the protrusion length of the waste-material entry prevention member 14 may be determined depending on the shape and size of the waste-material entry prevention member 14 and the cross-section of the flow passage. Needless to say, the waste-material entry prevention member 14 itself should be of the shape and size which does not hinder the flow of fluid and can prevent entry of waste material. Apart from this, it is only required that the waste-material entry prevention member 14 should leave a predetermined gap between its fore-end and the wall surface it faces, in order to prevent production of vortexes as described above.

Thus, the waste-material entry prevention member 14 does not need to be so provided as to protrude from the upper case 12 as described above. It may be provided to protrude from the lower case 11. Further, the waste-material entry prevention member 14 does not need to be a rod-like member. It may be a plate-like member arranged along the direction of flow of fluid. In this case, it is desirable that each surface of the plate-like member should be a curved surface in order to hinder the flow of the fluid as little as possible.

In the thermal flowmeter having the temperature control part 4, thermophoresis is caused near the surface of the thermal flow sensor 1 by making the temperature sensors Ru, Rd generate heat or driving the heater 1*a* included in the thermal flow sensor 1 to generate heat under the control of the temperature control part 4. Only by making use of this thermophoresis, aerosol (particles) contained in fluid can be kept away from the surface of the thermal flow sensor 13. Thus, only by simple control, adhesion and accumulation of aerosol (particles) onto the surface of the thermal flow sensor 13 can be prevented effectively.

In other words, by raising the temperature of fluid near the temperature sensors Ru, Rd and thereby causing thermophoresis of aerosol contained in the fluid and thereby preventing the aerosol from touching the temperature sensors Ru, Rd, the aerosol can be prevented from adhering to the temperature sensors Ru, Rd. In this case, since the surfaces of the temperature sensors Ru, Rd do not get soiled by aerosol adhering to and accumulating on them, flow rate measurement can be carried out with the thermal flow sensor 1 over a long period of time, stably.

Next, an electric smoking device according to the invention using a thermal flowmeter provided as described above will be described.

The smoking device does not burn a cigarette but heats it with a heater which is driven to generate heat by supplying a current, and thereby provides flavor and aroma of the cigarette (volatile constituent) in the form of gas, instead of smoke, for a smoker to suck. Thus, when a smoker sucks on a cigarette, production of smoke as well as production and scattering of ash, namely burnt tobacco leaves is prevented. An electric smoking device of this type is presented in detail in the above-mentioned U.S. Pat. No. 5,878,752.

FIG. 6 shows an example of electric smoking device according to the invention. As seen in FIG. 6, schematically, the electric smoking device comprises a tubular holder 21 arranged to surround a main body of a cigarette C excepting its mouth end part in which, for example a filter is provided, and a heater 22 incorporated in the holder 21 for heating a cigarette C fitted in the holder 21. In the holder 21, there is formed an outside-air drawing-in passage 23 which leads to a bottom of the holder 21. Through the outside-air drawing-in passage, outside air is drawn to the fore-end of the cigarette C fitted in the holder 21. In this outside-air drawing-in passage 23, there is provided a thermal flowmeter 24 for detecting the flow of outside air drawn to the interior of the holder 21.

As described referring to FIGS. 1 to 5, the thermal flowmeter 24 is so arranged that a thermal flow sensor 13 is incorporated in a case 10 which forms a predetermined flow passage, that waste-material entry prevention members 14 are provided at an entrance and an exit of the flow passage, and that adhesion of aerosol can be prevented by making temperature sensors Ru, Rd generate heat or driving a heater 1a to generate heat.

Figure 6:
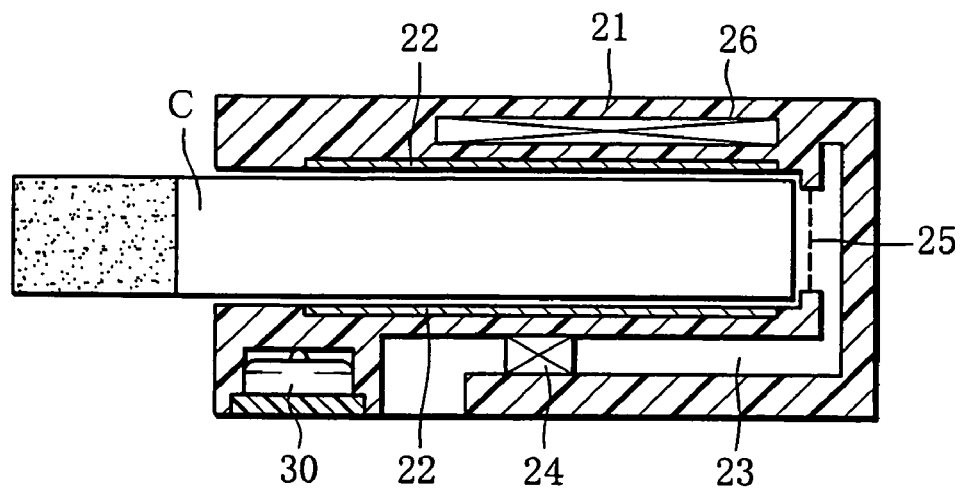
FIG. 6 is an illustration showing a schematic structure of a smoking device according to an embodiment of the invention.

In FIG. 6, reference numeral 25 denotes a mesh filter arranged to face the fore-end of the cigarette C. Reference numeral 26 is a drive circuit for the smoking device, which is an integrated circuit built in the holder 21. Reference numeral 30 is a rechageable battery as a drive source for the smoking device.

Figure 7:
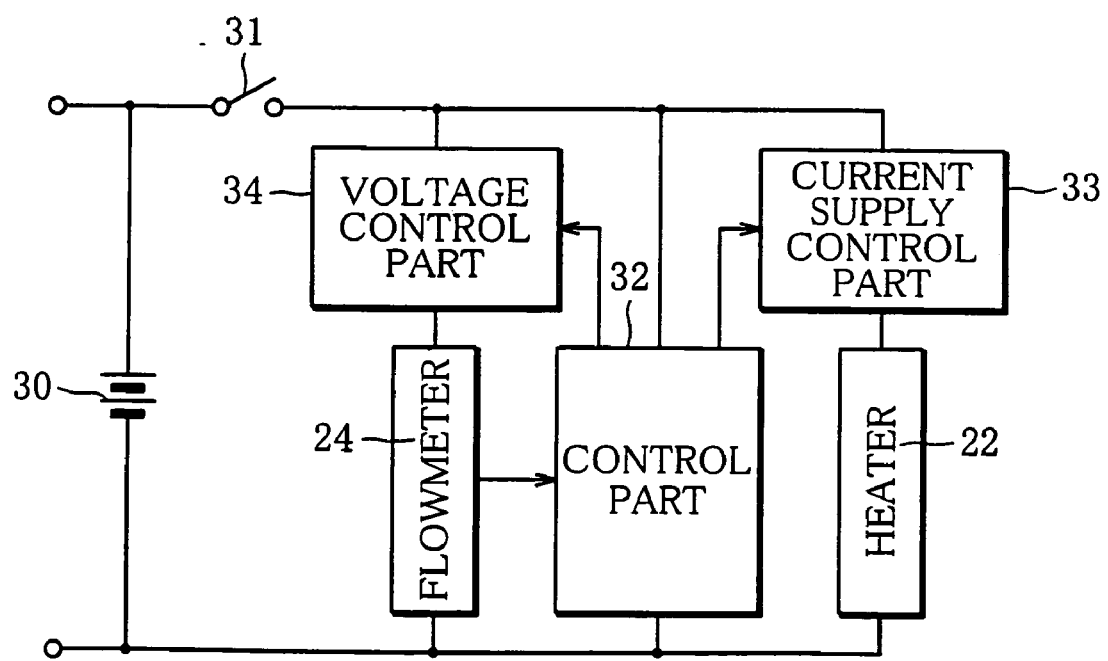
FIG. 7 is a diagram showing a structure of an electric circuit of the smoking device of FIG. 6.

FIG. 7 shows the structure of the drive circuit 26 for the smoking device. As seen in FIG. 7, the drive circuit 26 includes the rechageable battery 30 as a drive source, to which the heater 22 and the thermal flowmeter 24 are connected with a power switch 31 between. A control circuit (control part) 32 for controlling operation of the heater 22 and the thermal flowmeter 24 is connected to the rechageable battery 30 with the power switch 31 between. The control circuit 32 is so arranged as to control operation of a current-supply control part 33 series-connected to a power supply line for the heater 22, to thereby perform on/off-control on supply of a current to the heater 22, and to control operation of a voltage control part 33 series-connected to a power supply line for the thermal flowmeter 24, to thereby control drive voltage applied to the thermal flowmeter 24.

Specifically, when the power switch 21 is turned on, the control circuit 32 sets the smoking device in a flow-rate detection mode for detecting flow rate by means of the thermal flowmeter 24, by decreasing output voltage of the voltage control part 34. Also, the control circuit 32 puts the current-supply control part 33 in an off-state, and thereby puts the heater 22 in a current-supply standby state. The power switch 31 may be so arranged as to automatically turn on when a cigarette C is fitted in the holder 31.

Figure 8:
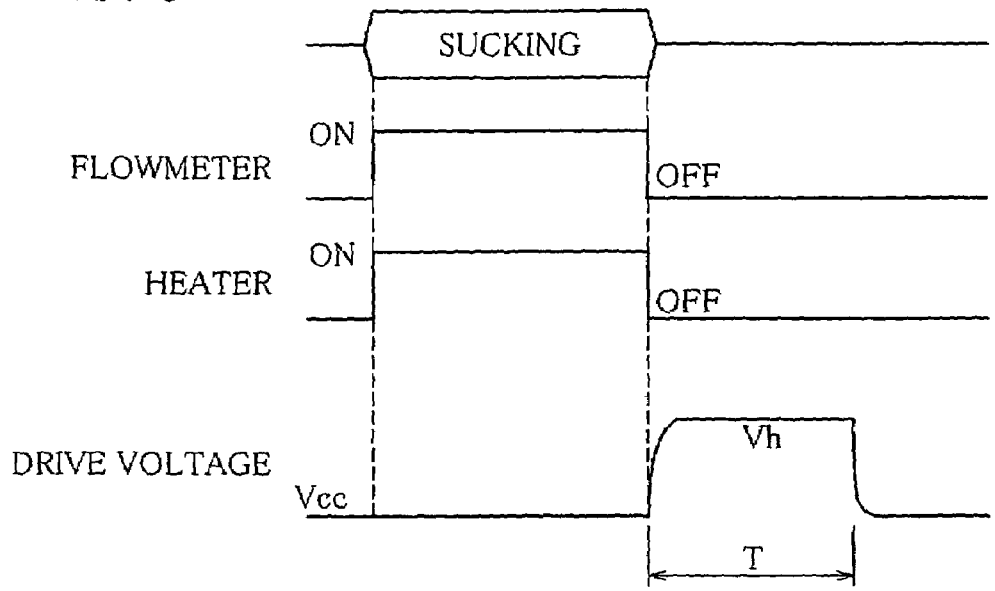
FIG. 8 is a timing diagram showing how the smoking device of FIG. 7 operates.

When a smoker sucks on a cigarette C fitted in the holder 21, the control circuit 32 detects the flow of air drawn through the outside-air drawing-in passage 23 to the interior of the holder 21 by this sucking, by means of the thermal flowmeter 24, and as shown in FIG. 8, while the cigarette is sucked on (over a sucking period), the control circuit 32 keeps the current-supply control part 33 in an on-state and thereby drives the heater 22 to generate heat. When stop of sucking on the cigarette C is detected by means of the thermal flowmeter 24, the control circuit 32 stops driving the heater 22 to generate heat and sets the smoking device in an aerosol adhesion prevention mode for preventing aerosol adhesion by means of the thermal flowmeter 24, by increasing the output voltage of the voltage control part 34 for a predetermined time T.

In the aerosol adhesion prevention mode, the temperature sensors Ru, Rd of the thermal flow sensor 13 are driven to generate heat by increasing the output voltage of the voltage control part 34. By this, thermophoresis is caused near the surface of the flow sensor 13 to prevent aerosol contained in fluid (air) entering the outside-air drawing-in passage 23 from adhering to the surface of the thermal flow sensor 13. It is mainly when the smoker stops sucking on the cigarette C and volatile constituents of the cigarette C flows from the cigarette C as so-called side stream smoke that a particularly large amount of aerosol enters the outside-air drawing-in passage 23.

Hence, in the present embodiment, when stop of sucking on the cigarette C is detected, the smoking device is set in the aerosol adhesion prevention mode for the predetermined time T to cause thermophoresis near the surface of the thermal flow sensor 13 to thereby prevent aerosol contained in the side stream smoke produced after stop of sucking from adhering to the surface of the thermal flow sensor 13. Particularly in the present embodiment, in order not to consume the limited battery capacity of the rechageable battery 30 wastefully, the drive voltage for the thermal flow sensor 13 (thermal flowmeter 24) is increased only for the predetermined time T in which a large amount of side stream smoke is produced, immediately after current supply to the heater 22 is stopped.

The electric smoking device provided as described above can detect the flow rate of air drawn in through the outside-air drawing-in flow passage 23 with good responsiveness, preventing entry of waste material contained in the air by means of the waste-material entry prevention members 14, and drives the heater 22 to generate heat on the basis of this detection. In particular, since the thermal flowmeter 24 has the structure so arranged that vortexes are not easily produced in the fluid (air) flowing by the waste-material entry prevention members 14 as described above, the flow of the air directed into the thermal flowmeter 24 can be detected with good responsiveness. Hence, air drawn in through the outside-air drawing-in passage 23 by a smoker's sucking on a cigarette C can be detected quickly, and the heater 22 is heated by supplying a current to the heater 22 on the basis of the detection. Thus, gas containing flavor and aroma constituents can be quickly produced from the cigarette C. Thus, the smoking device enables a smoker to suck on a cigarette C without sense of discomfort, like when the cigarette C is burnt.

As mentioned above, when sucking is stopped, the temperature sensors Ru, Rd of the thermal flow sensor 13 are made to generate heat to thereby cause thermophoresis to thereby prevent aerosol contained in side stream smoke produced by sucking on the cigarette C from adhering to the surface of the thermal flow sensor 13. Hence, the thermal flow sensor 13 can maintain its ability to detect the flow rate for a long time stably. Thus, the thermal flowmeter 24 can surely detect the flow of air drawn in through the outside-air drawing-in passage 23 by sucking on the cigarette C. Also, the thermal flowmeter 24 has improved operation reliability. Further, this makes it possible to quickly supply a current to the heater 22 to heat the cigarette C to thereby volatilize volatile constituents which produce flavor and aroma when the cigarette C is sucked on, and to quickly stop current supply to the heater 22 when sucking is stopped. Thus, wasteful electricity consumption can be held down.

When current supply to the heater 22 is stopped, drive voltage for the thermal flowmeter 24 is increased for a predetermined time T to prevent aerosol from adhering to the surface of the thermal flow sensor 13. This means that the thermal flow sensor 23 is driven with high power only temporarily when current supply to the heater 22 is stopped. Hence, burden on the rechageable battery 30 is not so large. Thus, the overall electricity consumption can be kept at a low level. Further, the thermal flowmeter 14 (thermal flow sensor 13) is effectively prevented from getting soiled with aerosol. This produces practically great effects such that long-term stable operation of the smoking device is ensured.

The present invention is not limited to the above-described embodiments. For example, the size and shape of the waste-material entry prevention member 14 may be determined depending on the shape and the like of the flow passage formed in the case 10. The height of the gap between the fore-end of the waste-material entry prevention member 14 and the wall surface of the flow passage may be determined depending on the structure of the flow passage and the like. In the above-described case, the flowmeter uses a thermal flow sensor 13. However, a waste-material entry prevention member similar to the described member 14 can be applied to an orifice type flowmeter in which an orifice (aperture) is formed in the flow passage and the gas flow rate is obtained from pressure (differential pressure) detected by making use of the orifice.

It may be so arranged that only the temperature sensors Ru, Rd (temperature measuring parts) of the thermal flow sensor 13 are driven to generate heat by increasing drive voltage or drive current for the temperature sensors Ru, Rd. Alternatively, it may be so arranged that only the heater element Rh provided between the temperature sensors Ru, Rd is driven to generate heat to have a high temperature.

Figure 9:
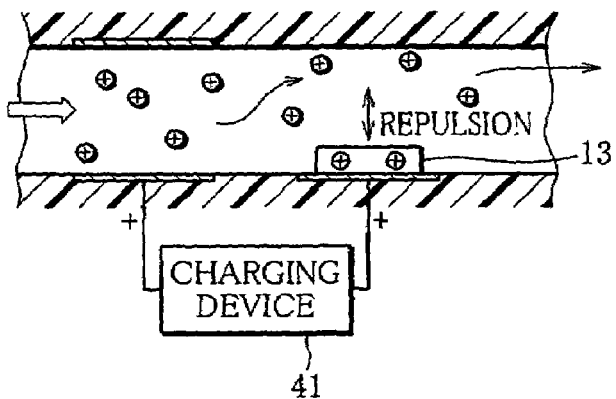
FIG. 9 is an illustration showing an example of aerosol adhesion prevention means using a charging device.

In the above-described embodiment, thermophoresis is caused near the surface of the thermal flow sensor 13 to prevent aerosol adhesion. However, if it is only required to prevent adhesion of aerosol to the thermal flow sensor 1 by an electric means, use of, for example a charging device is useful. Specifically, as shown in FIG. 9, for example, a charging device 41 is arranged at a flow passage through which fluid flows, upstream of a thermal flow sensor 13, to charge aerosol contained in the fluid and the thermal sensor 1 with the same polarity at the same time so that the aerosol will be kept away from the surface of the thermal flow sensor 13 due to repulsion.

Figure 10:
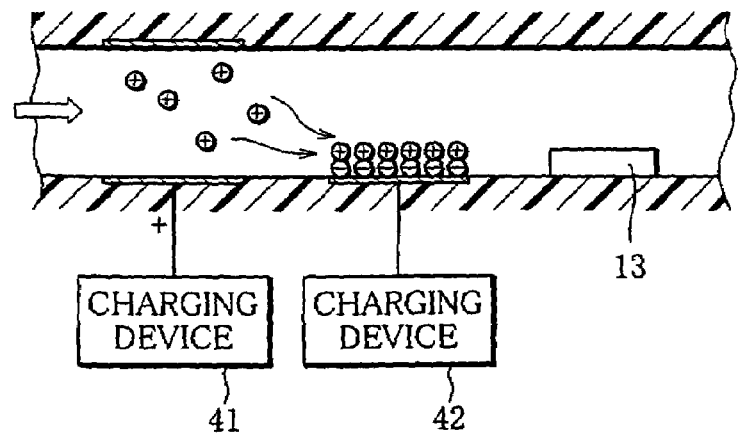
FIG. 10 is an illustration showing another example of aerosol adhesion prevention means using charging devices.

Alternatively, like an example shown in FIG. 10, it may be so arranged that a charging device 42 having the polarity opposite to that of a charging device 41 is arranged between the charging device 41 and a thermal flow sensor 13 to attract aerosol onto an electrode plate 42a of the charging device 42 to prevent the aerosol from flowing over the thermal flow sensor 13. However, when the charging devices 41, 42 are provided, it is inevitable that the flowmeter has a longer flow-passage length. Further, normally, high power is required to drive the charging devices 41, 42. Hence, causing thermophoresis near the surface of the thermal flow sensor 13 as described above is easier and allows a simpler structure of the flowmeter.

The thermal flowmeter according to the invention can be obtained also by modifying a drive circuit of an existing flowmeter. This means an advantage that the thermal flowmeter according to the invention has a broad range of applications. While the above-described flowmeter has both the waste-material entry prevention member 14 and the temperature control part 4, it is obvious that the flowmeter may have only one of the waste-material entry prevention member 14 and the temperature control part 4. The invention can be carried out with various modifications without deviating from the gist thereof.

To sum up, because of the structure in which gaps are left between the rod- or plate-like waste-material entry prevention members for preventing waste material from entering the flow passage in which the flow sensor is arranged and the wall surface of the flow passage, vortexes are not easily produced in the fluid which flows by the waste-material entry prevention members. Hence, the flow of the fluid is stabilized. This means that reliable and highly stable flow-rate measurement is ensured easily and effectively, without sacrificing the flow sensor's responsiveness in flow-rate measurement.

Since thermophoresis of fluid is caused near the surface of the thermal flow sensor by heating the thermal flow sensor or making the thermal flow sensor generate heat, aerosol (particles) contained in the fluid directed toward the surface of the thermal flow sensor is easily and effectively prevented from adhering to and accumulating on the surface of the thermal flow sensor.

In the smoking device according to the invention, aerosol contained in so-called side stream smoke produced by sucking on a cigarette C is easily and effectively prevented from adhering to the surface of the thermal flow sensor. This ensures reliable detection of the flow of air drawn in through the outside-air drawing-in passage by sucking on a cigarette C. This enables the arrangement that when a cigarette C is sucked on, a current is immediately supplied to the heater to heat the cigarette C to volatilize volatile constituents which produces flavor and aroma, and when sucking stops, current supply to the heater is immediately stopped. This arrangement holds down wasteful electricity consumption.

The smoking device can detect the flow of air drawn by sucking on a cigarette with good responsiveness and drive the heater to generate heat on the basis of this detection. This enables a smoker to suck on a cigarette without sense of discomfort, without burning the cigarette. Another practically important effect is that the smoking device prevents aerosol released from a cigarette from adhering to the surface of the thermal flow sensor to thereby ensure long-term stable operation of the thermal flow sensor.

What is claimed is:

1. A smoking device, comprising:
    a tubular holder, which has a bottom, for surrounding a cigarette except for a mouth end thereof;
    an outside-air drawing-in passage, which is connected to the bottom of the holder, for drawing outside air to a fore-end of the cigarette fitted in the holder;
    a flowmeter arranged in the outside-air drawing-in passage for detecting a flow of the outside-air drawn into the holder, said flowmeter comprising a thermal flow sensor including a pair of temperature measuring parts arranged in a direction of the flow of outside air with a space between, and means for heating outside air flowing across the temperature measuring parts; and
    a heater which is incorporated in the holder, and which is driven to heat the cigarette fitted in the holder when the flow of outside air drawn into the holder is detected by the flowmeter.

2. The smoking device according to claim 1, wherein the flowmeter and the heater are powered by a secondary battery attached to the tubular holder.

3. The smoking device according to claim 1, wherein the flowmeter further comprises:
    a case with a flow passage formed therein, and in which the thermal flow sensor is arranged on a wall surface of the case that defines the flow passage; and
    at least one waste-material entry prevention member which is arranged at a wall surface which defines the flow passage, upstream of the thermal flow sensor, to protrude substantially partially across the flow passage.

4. The smoking device according to claim 3, wherein the waste-material entry prevention member comprises a substantially columnar rod-like member.

5. The smoking device according to claim 3, wherein the waste-material entry prevention member comprises a substantially plate-like member.

6. The smoking device according to claim 3, wherein the wall surface on which the waste-material entry prevention member is arranged faces the wall surface at which the thermal flow sensor is arranged, and a predetermined gap is provided between a tip end of the waste-material entry prevention member and the wall surface at which the thermal flow sensor is arranged.

7. The smoking device according to claim 1, wherein the heating means comprises:
    a heat-generating part arranged between the temperature measuring parts to heat the outside air flowing across the temperature measuring parts; and
    a drive section to drive the heat-generating part to generate heat.

8. The smoking device according to claim 1, wherein the heating means comprises a drive section to drive the temperature measuring parts to generate heat.

* * * * *